US012436056B2

(12) United States Patent
Linde et al.

(10) Patent No.: US 12,436,056 B2
(45) Date of Patent: Oct. 7, 2025

(54) LEAKAGE DETECTION FOR PRESSURIZED FUEL TANKS

(71) Applicant: Airbus Operations GmbH, Hamburg (DE)

(72) Inventors: Peter Linde, Buxtehude (DE); Awista Nasiri, Glinde (DE)

(73) Assignee: Airbus Operations GmbH, Hamburg (DE)

( * ) Notice: Subject to any disclaimer, the term of this patent is extended or adjusted under 35 U.S.C. 154(b) by 301 days.

(21) Appl. No.: 18/203,714

(22) Filed: May 31, 2023

(65) Prior Publication Data

US 2023/0393014 A1 Dec. 7, 2023

(30) Foreign Application Priority Data

Jun. 2, 2022 (EP) .................................... 22177031

(51) Int. Cl.
G01M 3/04 (2006.01)
B64D 37/32 (2006.01)
G01M 3/16 (2006.01)
G01M 3/18 (2006.01)
G01M 3/20 (2006.01)
G01M 3/22 (2006.01)
B64D 37/06 (2006.01)

(52) U.S. Cl.
CPC ............. *G01M 3/047* (2013.01); *B64D 37/32* (2013.01); *G01M 3/226* (2013.01); *B64D 37/06* (2013.01)

(58) Field of Classification Search
CPC .......... G01M 3/226; G01M 3/04; G01M 3/16; G01M 3/18; G01M 3/20; G01M 3/22
See application file for complete search history.

(56) References Cited

U.S. PATENT DOCUMENTS 3,856,465 A 12/1974 Lipscomb
6,519,041 B1 * 2/2003 Berthold ................. G01M 3/38
356/477

FOREIGN PATENT DOCUMENTS

JP 2000044840 A * 2/2000
KR 20080056124 A 6/2008

OTHER PUBLICATIONS

European Search Report for Application No. 22177031 dated Nov. 15, 2022.

* cited by examiner

*Primary Examiner* — Herbert K Roberts
(74) *Attorney, Agent, or Firm* — KDW Firm PLLC

(57) ABSTRACT

Leakage detection for pressurized fuel tanks. To provide facilitated leakage detection, a leakage detection device for pressurized fuel tanks for storing a pressurized fuel includes a fuel-sensing tracer and a light-wave conducting component. The fuel sensing tracer is configured to alter its optical properties in the presence of a predetermined fuel. The light-wave conducting component is in optical contact with the fuel sensing tracer. Light travelling within the light-wave conducting component is modifiable by altered optical properties of the fuel sensing tracer such that modified light is indicative of the presence of fuel at the location of the fuel sensing tracer.

18 Claims, 7 Drawing Sheets

LEAKAGE DETECTION FOR PRESSURIZED FUEL TANKS

TECHNICAL FIELD

The disclosure herein relates to a leakage detection device for pressurized fuel tanks for storing a pressurized fuel, to a fuel tank for storing a pressurized fuel, to a leakage detection system for pressurized fuel tanks in an aircraft, to a method for manufacturing a leakage detection device for pressurized fuel tanks and to a method for detecting leakage of a pressurized fuel tank.

BACKGROUND

In order to reduce volume, hydrogen in liquid form is considered as promising storage form of fuel aboard an aircraft, in which volume is scarce. Contrary to standard metallic tanks, there is a potential weight reduction possible by a tank of carbon fiber reinforced polymer (CFRP). For example, a cylindrical liquid hydrogen storage tank made of CFRP has an inner pressure vessel, covered by multi-layered insulation (MLI), which is finally covered by an outer shell, e.g. also made of CFRP, to protect the MLI. When storing fuel under pressure, leakage of a tank must be detected as soon as possible. However, it has been shown that monitoring pressurized fuel tanks requires additional equipment adding unwanted weight to an aircraft.

There may thus be a need provide facilitated leakage detection for pressurized fuel tanks.

SUMMARY

An object of the disclosure herein is solved by the subject-matter and embodiments disclosed herein. It should be noted that the following described aspects of the disclosure herein apply also for the leakage detection device for pressurized fuel tanks for storing a pressurized fuel, for the fuel tank for storing a pressurized fuel, for the leakage detection system for pressurized fuel tanks in an aircraft and for the method for manufacturing a leakage detection device for pressurized fuel tanks as well as for the method for detecting leakage of a pressurized fuel tank.

According to the disclosure herein, a leakage detection device for pressurized fuel tanks for storing a pressurized fuel is provided. The device comprises a fuel-sensing tracer and a light-wave conducting component. The fuel sensing tracer is configured to alter its optical properties in the presence of a predetermined fuel. The light-wave conducting component is in optical contact with the fuel sensing tracer. Light travelling within the light-wave conducting component is modifiable by altered optical properties of the fuel sensing tracer such that modified light is indicative of the presence of fuel at the location of the fuel sensing tracer.

As an effect, leakage detection is provided in a reliable manner in parts of the tank independent of whether they are visible for inspection. The use of light transmission parts allows to transport optical detection signals to remote locations for further data processing.

According to an example, the fuel sensing tracer comprises at least a chemo-chromatic substance attached to a sensing base surface. The chemo-chromatic substance is chemo-chromatic sensitive to the predetermined fuel. In an option, the chemo-chromatic substance is chemo-chromatic sensitive to hydrogen. In another option, the chemo-chromatic substance is chemo-chromatic sensitive to liquified petroleum gas. In another option, the chemo-chromatic substance is chemo-chromatic sensitive to a mixture of hydrogen with other combustible gaseous fluids. However, also future pressurized fuels and respective detection substances or detection sensors are provided.

According to an example, in a first option, the chemo-chromatic substance is attached to a portion along the light-wave conducting component. One end of the light-wave conducting component is configured for light entering and the other end of the light-wave conducting component is configured for exiting the light-wave conducting component.

According to a second option, provided in addition or alternatively, the chemo-chromatic substance is attached to ii) an end portion of the light-wave conducting component. The other end is configured for light entering and exiting the light-wave conducting component.

According to an example, the fuel sensing tracer is provided as a reversible sensor that can be brought back to an initial sensing state by at least one of the group of: passing of a preset amount of time, supplying of a resetting substance and supplying of a resetting amount of energy.

According to the disclosure herein, also a fuel tank for storing a pressurized fuel is provided. The fuel tank has a tank enclosure defining a tank volume. The tank enclosure comprises an inner pressure vessel, an insulation sheathing covering an outer side of the inner pressure vessel, an outer shell and at least one leakage detection device according to one of the preceding examples. The inner pressure vessel comprises at least one reinforced layer made from multiple plies of a carbon fiber reinforced polymer structure. The insulation sheathing comprises at least two reflective layers and at least one spacer layer between the at least two reflective layers. The outer shell comprises a layer made from multiple plies of a carbon fiber reinforced polymer structure. The at least one leakage detection device is arranged within at least one of the group of: the inner pressure vessel, the insulation sheathing and the outer shell.

According to an example, the light-wave conducting component of the leakage detection device is provided as a multi-functional element within the tank enclosure fulfilling at least one of the group of: electrical insulating and structural supporting as at least one further function in addition to the light-wave conducting as a first function.

According to an example, the light-wave conducting component of the leakage detection device is provided as a glass fiber of an existing glass fiber layer of at least one of the group of: the inner pressure vessel, the insulation sheathing and the outer shell.

According to an example, the light-wave conducting component of the leakage detection device is provided as at least one glass fiber added to at least one of the group of the inner pressure vessel, the insulation sheathing and the outer shell.

According to an example, a plurality of the leakage detection devices is provided that are arranged in a sensor pattern across the vessel forming the fuel tank.

According to the disclosure herein, a leakage detection system for pressurized fuel tanks in an aircraft is provided. The system comprises at least one fuel tank for storing a pressurized fuel according to one of the preceding examples. The system also comprises a light source and a light detector, a processing unit and a display unit. The light source is in optical contact with the light-wave conducting component and is configured to emit light into the light-wave conducting component. The light detector is in optical contact with the light-wave conducting component and is configured to receive light from the light-wave conducting component.

The processing unit is configured to receive data from the light detector representing the received light. The processing unit is also configured to determine, based on the received light, a presence of the fuel within the tank enclosure indicating a leakage of the fuel tank. The processing unit is further configured to generate indicator data for being displayed on the display unit. The display unit is configured to provide the indicator data.

According to the disclosure herein, also a method for manufacturing a leakage detection device for pressurized fuel tanks is provided. The method comprises the following steps: providing a fuel-sensing tracer configured to alter its optical properties in the presence of a predetermined fuel; providing a light-wave conducting component; and arranging the fuel-sensing tracer and the light-wave conducting component such that the light-wave conducting component is in optical contact with the fuel sensing tracer. Light travelling within the light-wave conducting component is modifiable by altered optical properties of the fuel sensing tracer such that modified light is indicative of the presence of fuel at the location of the fuel sensing tracer.

According to the disclosure herein, a method for detecting leakage of a pressurized fuel tank is provided. The method comprises the following steps: generating light by a light source and transmitting the light into a light-wave conducting component of a leakage detection device; affecting the light by a fuel sensing tracer configured to alter its optical properties in the presence of a predetermined fuel; transmitting the affected light through the light-wave conducting component towards a light detector; and detecting the affected light for determining a presence of fuel as an indicator of a leakage of the pressurized fuel tank.

In an example, a pairwise use of the (existing) GFRP fibers on the inner pressure vessel is arranged for sensing. The designated fibers are cut off at different locations. As an example, this is provided as to result in evenly spaced locations over the vessel. Chemo-chromatic tape is glued to pairwise optical fiber ends. The designated optical fibers are connected to a color spectrometer. The spectrometer is connected to a computer with a dedicated graphical software displaying intensity and location of hydrogen leaks on a display.

According to an aspect, a leakage is detected inside the wall structure by providing a sensor or tracer inside the wall structure where fuel might be present due to a leakage. By arranging a light transmitting component, optical property changes of the sensor can be detected by an external camera and an indicator of a leakage can be provided to the user.

As an advantage, quick and reliable indication of the location of any hydrogen leak is enabled. In an example, the optical glass fibers used are provided to be multifunctional, relating to sensing and at least one of electrically insulating and structural support. As a result, an inexpensive technology is provided that is also easy to apply and that has a long term functionality and low maintenance needs. A repeated application indicates a good pinpointing of damage location. The setup is provided either with special fiber optical cables or ordinary glass fibers, or both in a combined manner. As a further advantage, no electricity is needed from the transmitter/receiver onwards. Hence, the detection is also not vulnerable to electromagnetic fields.

These and other aspects of the disclosure herein will become apparent from and be elucidated with reference to the embodiments described hereinafter.

BRIEF DESCRIPTION OF THE DRAWINGS

Example embodiments of the disclosure herein will be described in the following with reference to the following drawings:

FIG. 1a shows an example with light travelling towards a target area with the fuel sensing tracer and back in the same optical fiber. FIG. 1b shows an example with light travelling towards a target and back from the target in different optical fibers. FIG. 1c shows an example with light travelling towards a target area with a fuel sensing tracer arranged along a portion of an optical fiber and further to a light detector or light sensor. FIG. 1d shows a further example with light travelling towards a target and back from the target in different optical fibers.

FIG. 2a schematically shows a longitudinal cross-section. FIG. 2a schematically shows a longitudinal cross-section and a transverse cross-section.

DETAILED DESCRIPTION

Figure 1A:
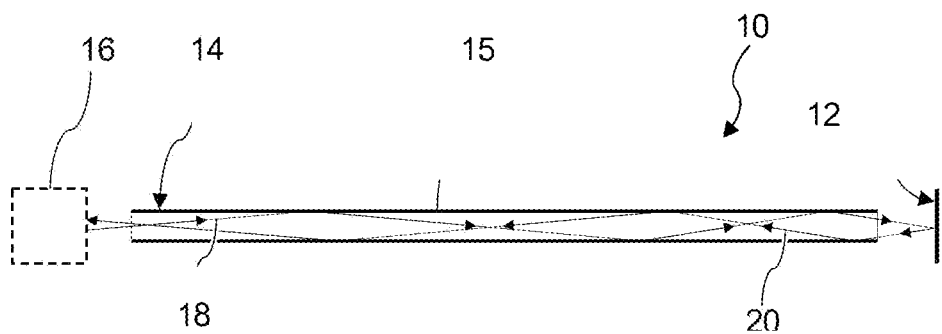
FIG. 1a, FIG. 1b, FIG. 1c and FIG. 1d schematically show examples of a leakage detection device for pressurized fuel tanks for storing a pressurized fuel.

Certain embodiments will now be described in greater detail with reference to the accompanying drawings. In the following description, like drawing reference numerals are used for like elements, even in different drawings. The matters defined in the description, such as detailed construction and elements, are provided to assist in a comprehensive understanding of the example embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

Figure 1B:
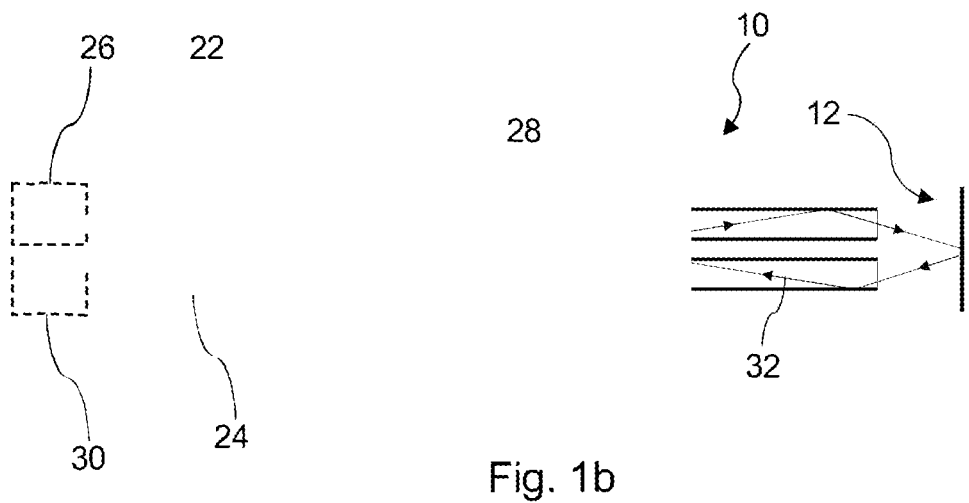

FIG. 1a and FIG. 1b schematically show examples of a leakage detection device 10 for pressurized fuel tanks for storing a pressurized fuel. The leakage detection device 10 comprises a fuel-sensing tracer 12 and a light-wave conducting component 14. The fuel sensing tracer 12 is configured to alter its optical properties in the presence of a predetermined fuel. The light-wave conducting component 14 is in optical contact with the fuel sensing tracer 12. Light travelling within the light-wave conducting component 14 is modifiable by altered optical properties of the fuel sensing tracer 12 such that modified light is indicative of the presence of fuel at the location of the fuel sensing tracer 12.

This allows a detection of a leakage with minimized means due to the optical detection approach.

FIG. 1a shows an example with light travelling towards a target and back from the target in the same optical fiber as an example for the light-wave conducting component 14. A light source 16 is indicated in broken lines as an option. Light travelling from the light source 16 (also acting as light detector, e.g. an optical camera) towards a target area with the fuel sensing tracer 12 is indicated with a first ray 18 reflected within the light-wave conducting component 14, e.g. an optical fiber Light travelling from the target area with the fuel sensing tracer 12 towards the light detector, i.e. the light source 16, is indicated with a second ray 20.

FIG. 1b shows an example with light travelling towards a target and back from the target in different optical fibers. The light-wave conducting component 14 comprises a first optical fiber 22 and a second optical fiber 24. A light source 26 generates first light, such as laser light beam, that due to reflection within the optical fiber travels through the first optical fiber 22 towards a target area with the fuel sensing tracer 12, as indicated with a first ray 28. A light detector 30 is indicated next to the light source 26. Light reflected by the fuel sensing tracer 12 provides a second light beam travelling back through the second optical fiber 24 towards the light detector 30, as indicated with a second ray 32.

Figure 1C:
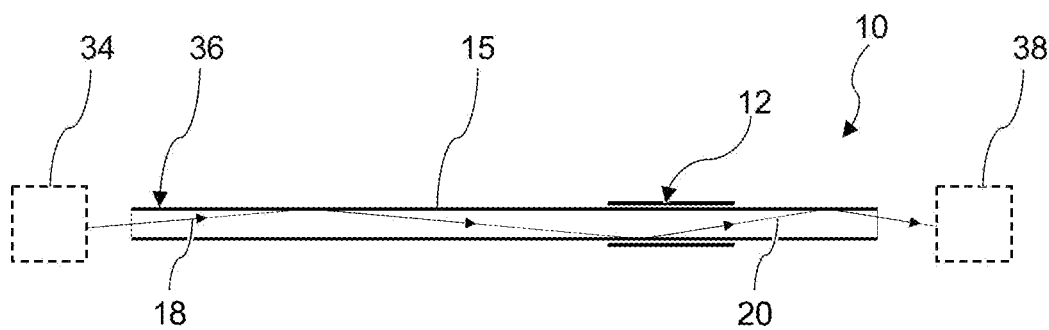
Figure 1D:
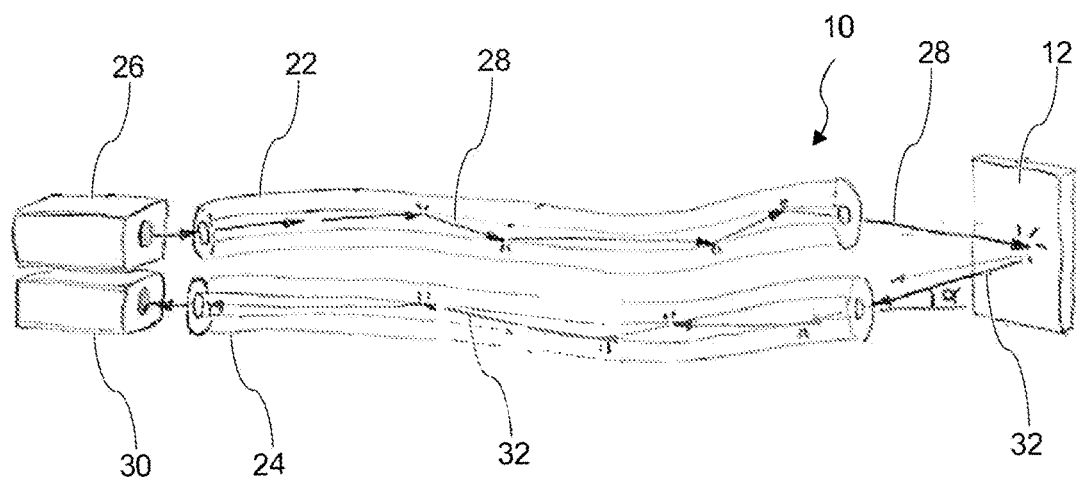

FIG. 1d shows another example with light travelling towards a target and back from the target in different optical fibers. As indicated in FIG. 1d, the optical fibers can be arranged in a curved shapes, which applies also for the examples shown FIG. 1a, FIG. 1b and FIG. 1c.

The term "fuel-sensing tracer" relates to a sensor-like element that senses fuel, for example a predetermined fuel like hydrogen. The fuel-sensing tracer can also be referred to as fuel-sensing probe, fuel-sensing sensor, fuel-detecting probe, fuel-detecting sensor, fuel tracer or fuel sensor. The fuel sensing tracer can also be referred to as optical fuel tracer, optical fuel sensor, optical sensor or optical tracer.

The term "light-wave conducting component" relates to a longitudinal element that allows the transmission of light towards a target area and the further transmission from the target area to a coupling with further detector components. The light-wave conducting component can also be referred to as light conductor, optical conductor, light-wave guide or light transmitter.

The term "optical properties" relates to the characteristics of the surface of the fuel sensing tracer regarding the impinging, absorption and reflecting of light. The optical properties can also be referred to as optical characteristics or light affecting properties.

The term "predetermined fuel" relates to a fuel to be stored under pressure in the pressurized tank. The predetermined fuel can also be referred to as designated fuel, stored fuel or detected fuel. As an example, the predetermined fuel is hydrogen.

The term "in optical contact" relates to the transfer of a light beam from the light-wave conducting component to the fuel sensing tracer and also from the fuel sensing tracer to the light-wave conducting component. The optical contact can also be referred to as in optical communication.

The term "light is modifiable" relates to having an influence of the light beam characteristics. This can also be referred to as modifying or manipulating the light properties.

The term "altered" relates to changed or varied properties of the fuel sensing tracer.

In an example, the properties are altered, i.e. changed temporarily for the duration of the presence of fuel. In an example, a delayed re-change to the non-altered state of the fuel sensing tracer permanent is provided.

In an example, the properties are altered, i.e. changed permanently, i.e. also when fuel is not present anymore.

The fuel sensing tracer is reactive to the predetermined fuel such that the fuel sensing indicator changes its optical properties.

The fuel sensing tracer can also be referred to as fuel sensing indicator.

The modified light is indicative of the presence of the predetermined fuel at the location of the fuel sensing tracer. The term "presence of fuel" may relate to a predetermined minimum fraction or ratio of the predetermined fuel.

According to an example, the fuel sensing tracer comprises at least a chemo-chromatic substance attached to a sensing base surface, see also below and FIG. 7. The chemo-chromatic substance is chemo-chromatic sensitive to the predetermined fuel.

In an option, the chemo-chromatic substance is chemo-chromatic sensitive to hydrogen.

In an example, the fuel sensing tracer comprises a substance sensitive to a predetermined fuel. Besides hydrogen, the term fuel also relates to other fuels for operating aircrafts, which fuels are stored in tanks under pressure.

In an example, the fuel sensing tracer comprises a chemo-chromatic hydrogen sensitive carrier or probe. As an example, Palladium oxide (PdO) is combined with Titanium oxide (TiO) and mixed into a powder. When hydrogen is present, the powder changes its color. The powder-mix may be glued onto one side of a tape.

In another example, other fuels than hydrogen are detected by other chemical substances.

FIG. 1c schematically shows a further example of a leakage detection device for pressurized fuel tanks for storing a pressurized fuel. FIG. 1c shows an example with light travelling from a light source 34 towards a target area with the fuel sensing tracer 12 arranged along a portion of an optical fiber 36 and further to a light detector 38 or light sensor. While passing the portion of the optical fiber 36 with the fuel sensing tracer 12, the light is affected by the fuel sensing tracer 12, when the predetermined fuel is present, i.e. the light is modified, which can then be detected by the detector 38.

According to an example, as indicated in FIG. 1c, provided as an option, the chemo-chromatic substance is attached to a portion along the light-wave conducting component 14. One end of the light-wave conducting component 14, in FIG. 1c the end on the left, is configured for light entering; the other end of the light-wave conducting component 14, in FIG. 1c the end on the right, is configured for exiting, i.e. leaving, the light-wave conducting component 14.

In another option, not further shown in detail, the chemo-chromatic substance is attached to an end portion of the light-wave conducting component. The other end is configured for light entering and exiting the light-wave conducting component.

In an example, the light-wave conducting component comprises a duplex glass fiber arrangement. The chemo-chromatic substance is attached to a portion along a first of the two glass fibers. When the travelling light reaches the end of the first of the two fibers, it is reflected back into the second of the two glass fibers.

In another example, the light-wave conducting component comprises a glass fiber arrangement. The chemo-chromatic substance is attached to a portion along the glass fiber arrangement. When the travelling light reaches the end of the glass fiber arrangement, it is sensed by a detector, like a camera and evaluated for potential leakage at the location where the chemo-chromatic substance is attached to the glass fiber arrangement.

In an example, the light-wave conducting component is running along the length of a fuel tank, e.g. starting at one end of the fuel tank, but ending before reaching the other end of the fuel tank. The term "portion along the light-wave conducting component" relates to portions between both ends of the fuel tank.

In another example, the light-wave conducting component is running along the complete length of a fuel tank. The term "along the light-wave conducting component" relates to portions between both ends of the fuel tank.

According to an example, in an option, the chemo-chromatic substance is applied to an end of the light-wave conducting component 14. The other end of the light-wave conducting component 14 is configured for light entering and exiting the light-wave conducting component 14.

In another option, the chemo-chromatic substance is attached to a tape. The tape is mounted on an end of the light-wave conducting component. The other end of the light-wave conducting component 14 is configured for light entering and exiting the light-wave conducting component 14.

In an example, the chemo-chromatic substance is embedded in a carrier matrix that encloses one of the ends end of the light-wave conducting component In another option, the chemo-chromatic substance is attached to a tape. The tape is mounted on an end of the light-wave conducting component 14. The other end of the light-wave conducting component 14 is configured for light entering and exiting the light-wave conducting component.

According to another example, also shown in FIG. 1a, in an option, the light-wave conducting component 14 comprises at least one optical fiber. The at least one optical fiber comprises a first end and a second end. The first end is configured for light entering and light exiting, and a reverse of the light travelling direction is provided at the second end.

According to an example, also shown in FIG. 1c, in another option, the light-wave conducting component 14 comprises at least one optical fiber. The at least one optical fiber comprises a first and a second end. The first end is configured for light entering, and the second end is configured for light exiting.

In an example, the first end is configured for light entering and light exiting, and the reverse of the light travelling direction is provided at the second end by providing a coating of the end by the fuel sensing tracer, e.g. the chemo-chromatic substance.

In another example, the first end is configured for light entering and light exiting, and the reverse of the light travelling direction is provided at the second end by providing an exiting of the light and transmission to a surface comprising a coating by the fuel sensing tracer, e.g. the chemo-chromatic substance, and a reflection of the light and re-entering of the light into the light-wave conducting component.

In an example, the light-wave conducting component comprises one optical fiber for bidirectional travelling of light, entering and exiting at the same end.

In an example, the light-wave conducting component comprises one optical fiber for bidirectional travelling of light, entering and exiting at the same end.

In an example, a duplex optical fiber is provided for the light-wave conducting component. The duplex optical fiber comprises to glass fibers arranged in an adjacent manner.

According to an example, the fuel sensing tracer 12 is provided as a reversible sensor that can be brought back to an initial sensing state by at least one of the group of: passing of a preset amount of time; supplying of a resetting substance; and supplying of a resetting amount of energy.

In an example, the fuel sensing tracer 12 is provided as a reversible sensor. The detection is then provided by cameras connected to the light-wave conducting component. Even though the sensor itself my not show the changes anymore, by recording the images (via the light-wave conducting component) supplied to the camera, an indicator can be generated nevertheless.

Figure 2A:
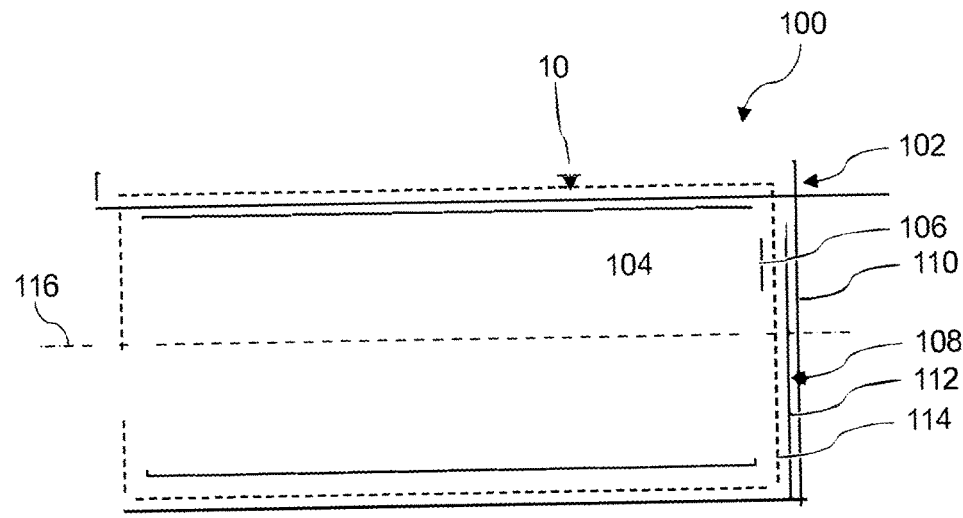
FIG. 2a and FIG. 2b show an example of a fuel tank for storing a pressurized fuel.
Figure 2B:
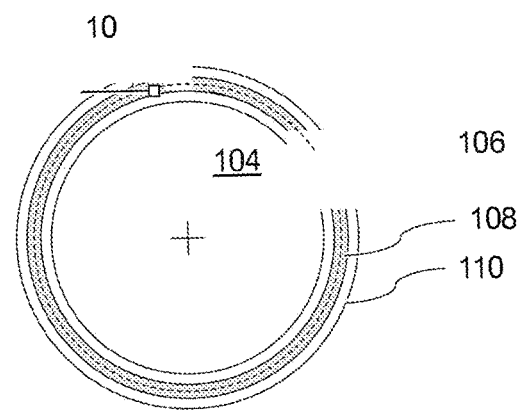

FIG. 2a and FIG. 2b show an example of a fuel tank 100 for storing a pressurized fuel. FIG. 2a schematically shows a longitudinal cross-section; and FIG. 2a schematically shows a longitudinal cross-section and a transverse cross-section. The fuel tank 100 has a tank enclosure 102 defining a tank volume 104. The tank enclosure 102 comprises an inner pressure vessel 106, an insulation sheathing 108 covering an outer side of the inner pressure vessel 106, an outer shell 110 and at least one example of the leakage detection device 10 according to one of the preceding examples. The inner pressure vessel 106 comprises at least one reinforced layer made from multiple plies of a carbon fiber reinforced polymer structure. The insulation sheathing 108 comprises at least two reflective layers 112 and at least one spacer layer 114 between the at least two reflective layers 112. The outer shell 110 comprises a layer made from multiple plies of a carbon fiber reinforced polymer structure. The at least one leakage detection device 10 is arranged within at least one of the group of: the inner pressure vessel 106, the insulation sheathing 108 and the outer shell 110.

The fuel tank 100 is schematically shown as cylinder with a longitudinal axis 116. It is noted that other suitable forms for accommodating fuel under pressure are also provided, like sphere-shaped tank sections, but they are not further shown.

According to an example, provided as an option, the light-wave conducting component 14 of the leakage detection device 10 is provided as a multi-functional element within the tank enclosure 102 fulfilling at least one of the group of: electrical insulating and structural supporting as at least one further function in addition to the light-wave conducting as a first function.

Hence, the light-wave conducting component 14 is provided for an optical transmission function plus an additional function, such as electromechanical (electric isolation) function or mechanical (structural support) function or spacer (structural support) function. The optical transmission function of the light-wave conducting component 14 can be referred to as primary function, the at least one additional function can be referred to as secondary function.

The term "structural supporting" comprises the capability to absorb tensile forces as reinforcement of the tank structure under pressure. The structural support is thus in longitudinal, i.e. axial, or in circumferential direction of the pressurized tank. The term "structural supporting" may also comprise the capability to distance the reflecting layers of the insulating layer. The structural support is thus in radial direction of the pressurized tank.

Figure 3:
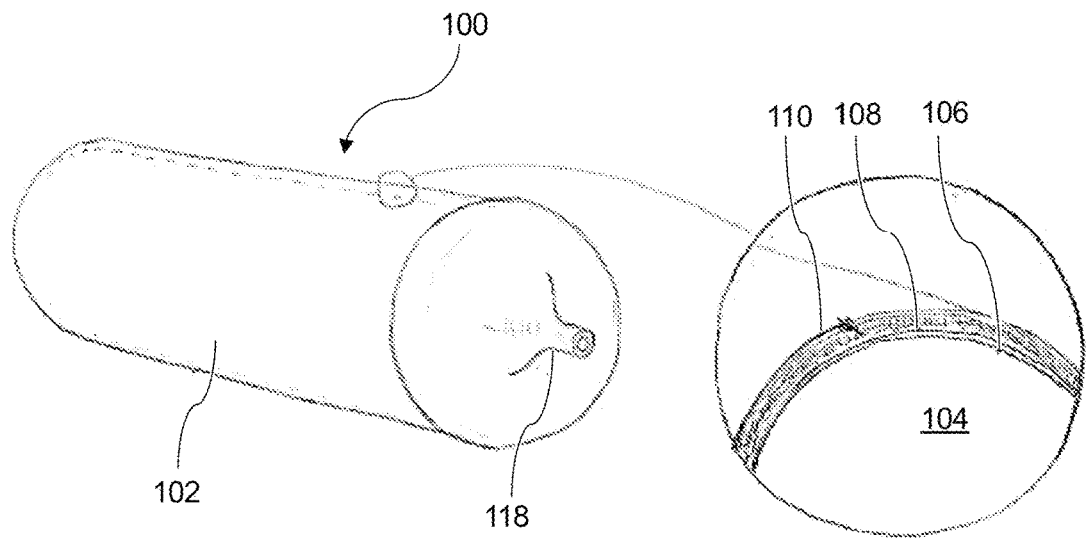
FIG. 3 shows an isometric view of a fuel tank with a detail showing a constructional setup of the fuel tank.

FIG. 3 shows an isometric view of an example of the fuel tank 100 with a detail showing a constructional setup of the fuel tank enclosure 102. The tank 100 is provided with a tapered end face 118. For example, the tapered end face 118 provides a closable opening for filling and discharging the tank 100.

Figure 4:
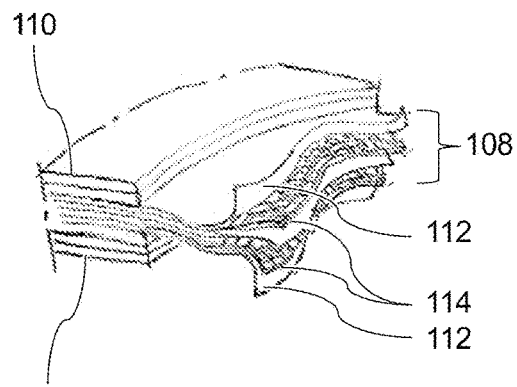
FIG. 4 shows a detailed example of a wall section of the fuel tank in an isometric view.

FIG. 4 shows a detailed example of a wall section of the fuel tank 100 in an isometric view.

In the following, the insulation sheathing 108 is also referred to as multilayer insulation 108. The reflective layers 112 are also referred to as reflecting layers 112. The spacer layer 114 is also referred to as net spacers 114 or spacer mesh 114. The outer shell 110 is also referred to as cover ply 110.

FIG. 4 shows a detail of the cylindrical part with the individual layers shown, with focus on the multilayer insulation 108, which comprises the thin reflecting layers 112 as well as net spacers 114, allowing some distance between each reflecting layer 112. The reflecting layers 112 can comprise, for example, Mylar or Kapton, that may be approximately 5-6 μm thick. For reflection, in an example, these layers are coated with e.g. silver or aluminum. The spacer mesh 114 is placed in between each reflective layer 112. The spacer mesh 114 may be a polymer with low thermal conductivity. It has the purpose to provide a small distance between two reflective layers 112. The thickness of the mesh may be 0.2 to 0.5 mm. A complete MLI-blanket 108, with about 40 reflective layers 112 spaced by spacer meshes 114, may have a total thickness of approximately 20 to 25 mm.

FIG. 4 shows a detail of a carbon fiber reinforced polymer (CFRP) LH2 tank's cross-section with the multi-layer insulation 108 and its constituents. The inner pressure vessel 106 is provided, e.g. as CFRP, i.e. multiple plies, each 0.125-0.26 mm. The cover ply 110, ideally of glass fiber reinforced polymer (GFRP), 0.02-0.0125 mm (thin) and acting as electrically insulating layer is also provided. Further, an example of the multi-layer insulation 108 is further provided. The multi-layer insulation comprises an example of the reflective layer 112, e.g. made from Mylar or Kapton. Further, an example of the spacer mesh 114 is provided within the multi-layer insulation 108, e.g. a polymer, 0.2-0.5 mm thick. The outer shell 110 is arranged, e.g. of CFRP, multiple plies, each 0.125-0.26 mm, with a 0.02-0.0125 mm (thin) cover ply, also of GFRP, acting as electrically insulating layer.

Figure 5:
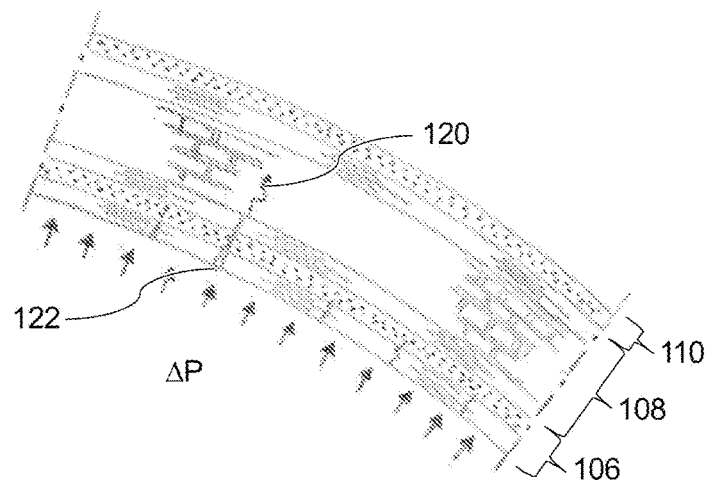
FIG. 5 shows a detailed example of a wall section of the fuel tank in a cross-sectional view.

FIG. 5 shows a detailed example of a wall section of the fuel tank 100 in a cross-sectional view. FIG. 5 shows a cross-section through the cylindrical part, in which it is seen that due to cracking in the inner pressure vessel 106, hydrogen can penetrate into the MLI layer 108. Hydrogen 120, gaseous, or liquid, is indicated that has penetrated inner pressure vessel 106. The inner pressure vessel 106, made from CFRP, e.g. with multiple plies, each 0.125-0.26 mm and a 0.02-0.0125 mm cover ply ideally of GFRP (electrically insulating), are provided that can take up inner pressure difference structurally. A crack 122 indicates a damage in the inner pressure vessel, allowing hydrogen to penetrate into the multi-layer insulation 108. The outer shell 110 may have CFRP, multiple plies, each 0.125-0.26 mm, and a 0.02-0.0125 mm cover ply, ideally of GFRP (electrically insulating).

It is of importance to detect any hydrogen, that may, unintentionally, penetrate the inner pressure vessel 106. This applies regardless, of whether there is an underpressure or not, in the MLI layer 108. Not only the fact that there may be a hydrogen leak, but also the location of the leak is desirable to know as soon as possible. The fact that the MLI 108 is covering the total area makes it challenging to use other methods, such as thermal cameras, that would else be possible. Hence, the leakage detection device 10 as described herein allows the detection of a leakage and its localization in a facilitated setup.

In an example, fiber optical cables are provided for optical sensing. As an example, FIG. 1d shows a duplex fiber optical cable system, comprising a transmitter, e.g. the light source 26, that transmits an optical signal 28, e.g. by laser light, outgoing fiber optical cable comprising a glass core and (optionally) a glass mantle with lower optical breaking index than the class core Thus, optical signals from the core will be fully reflected back into the core up to a certain angle. Further, the target is provided to be optically measured with its own optical characteristics, including surface color, reflection, etc. A return signal 32 is reflected by the target. The optical signal returned is influenced by optical characteristics of the target (reflector), and the reflected light will enter into the glass core in the ingoing cable if in an equal or less than 12° angle is provided, as an example. An ingoing fiber optical cable that carries the return signal comprises a glass core and (optionally) a glass mantle. Finally, a receiver, e.g. the light detector 30 will transmit the return signal to evaluation, e.g. by a spectrometer, computer, imaging software and the like.

Figure 6:
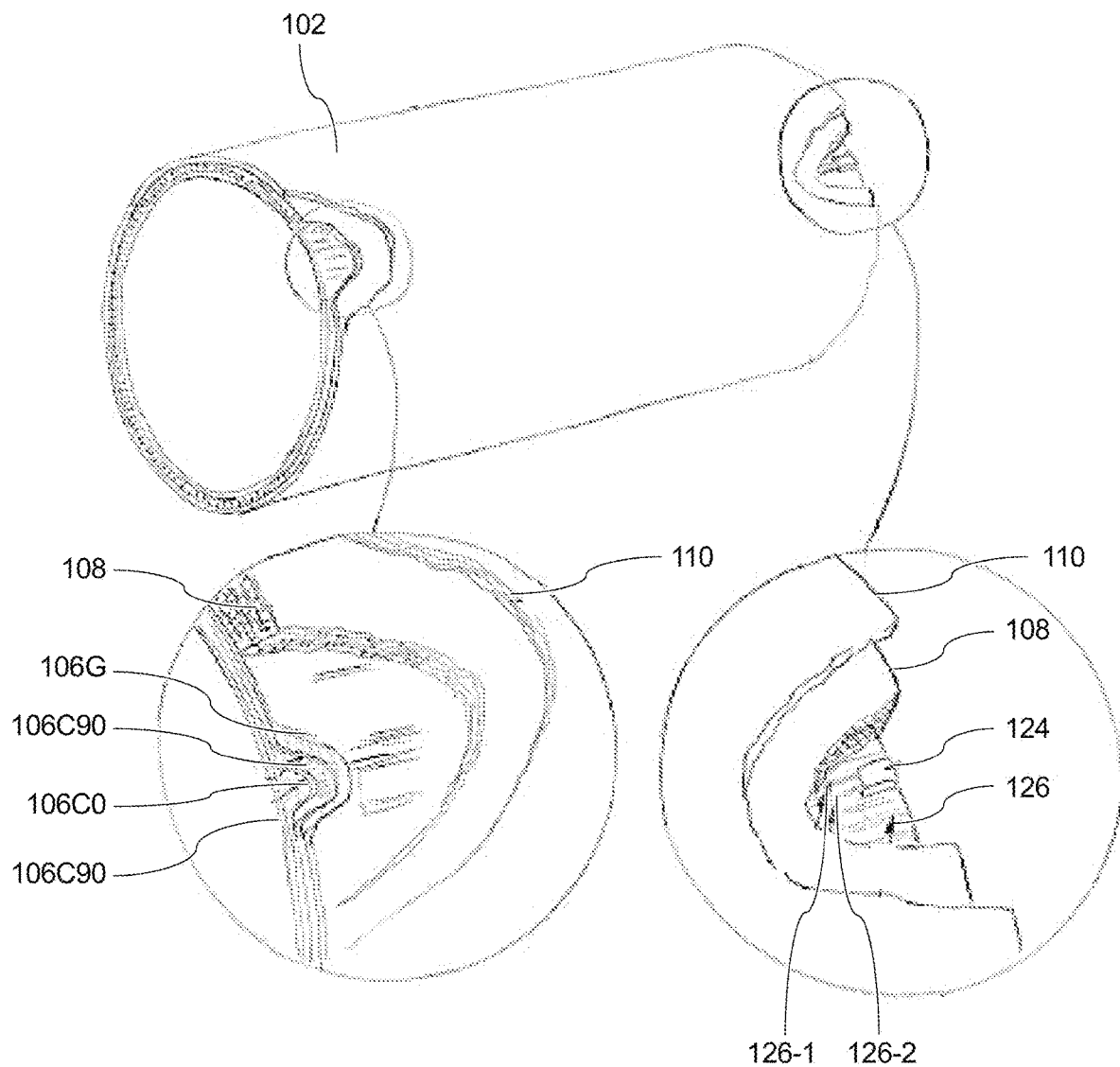
FIG. 6 shows an isometric view of a fuel tank with details showing a constructional setup of the fuel tank and an example for an implementation of a leakage detection device.

FIG. 6 shows an isometric view of the fuel tank 100 with details showing a constructional setup of the tank enclosure 102. FIG. 6 also shows an example for an implementation of the leakage detection device 10.

FIG. 6 shows an example of a cylindrical CFRP liquid hydrogen tank, comprising the inner pressure vessel 106, followed by the MLI 108, covered by the outer shell 110. The CFRP liquid hydrogen tank is provided with an integrated hydrogen leakage detection system, based on multifunctional glass fibers and chemo-chromatic tape (or other application of chemo-chromatic substances). A CFRP liquid hydrogen storage tank is provided, shown with its cylindrical part. An inner pressure vessel 106C0 is provided, e.g. CFRP ply in 0° direction. A further inner pressure vessel 106C90 is provided, e.g. CFRP ply in 90° direction. An inner pressure vessel 106G is provided, e.g. GFRP ply, here in 0° direction. An MLI layer 108 is arranged followed by the outer shell 110. A chemo-chromatic tape 124 is indicated covering duplex optical glass fibers. Further, glass fibers 126 of GFRP ply are provided on the inner pressure vessel 106. A first glass fiber 126-1 for an outgoing signal in an optical hydrogen detection and a second glass fiber 126-2 for an ingoing signal in an optical hydrogen detection are indicated.

Figure 7:
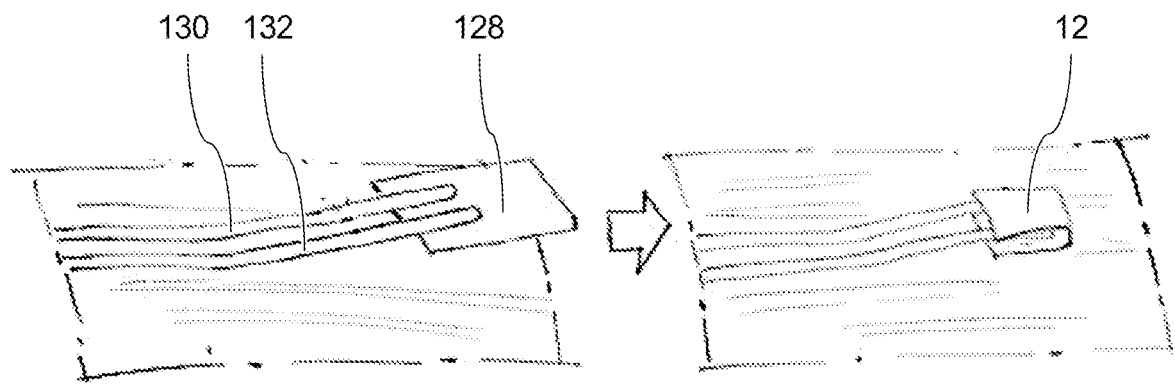
FIG. 7 shows an example for providing a leakage detection device.

FIG. 7 shows an example for providing a leakage detection device. In FIG. 7, it is shown in detail how the chemo-chromatic tape is attached to the two (duplex) glass fibers. To the left, the two glass fibers are seen, under which a piece of chemo-chromatic tape is placed. The glass fibers are glued to the tape. To the right, it is seen that the tape is folded over the glass fibers, and is glued in place. No glue is applied on the far end of the tape, being visible to the ends of the glass fibers. The chemo-chromatic powder coating is on the inside of the folded tape, towards the glass fiber ends.

FIG. 7 shows an example for the fuel sensing tracer 12. As indicated, a chemo-chromatic tape 128 that is provided covering duplex optical glass fibers, e.g. a first glass fiber 130 for outgoing signal in optical hydrogen detection, together with a second glass fiber 132 for ingoing signal in optical hydrogen detection, as shown in the left part of FIG. 7. The chemo-chromatic tape 128 is wrapped around the end portions of the duplex optical glass fibers, providing the fuel sensing tracer 12, as shown in the right part of FIG. 7.

Figure 8:
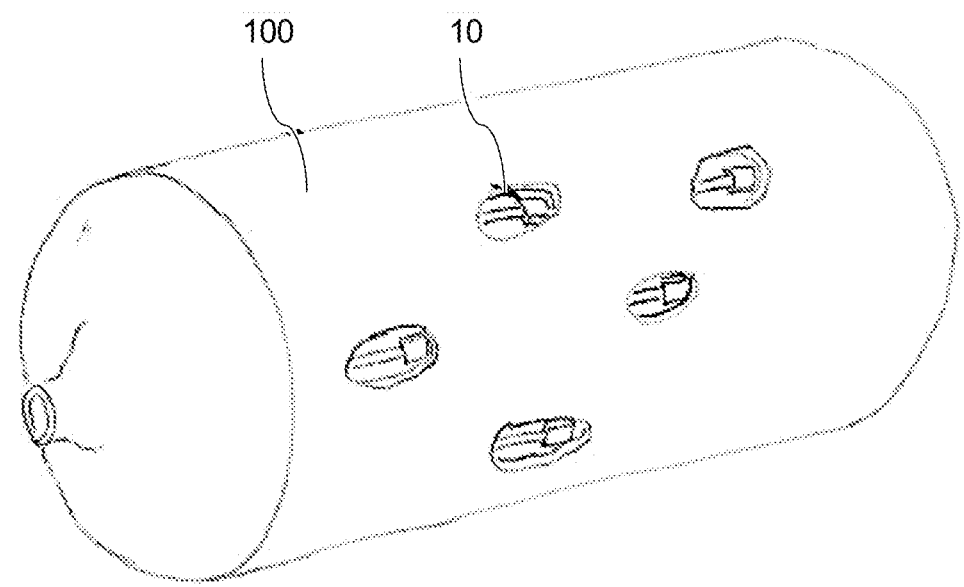
FIG. 8 shows an example of a fuel tank with a plurality of leakage detection devices.

FIG. 8 shows an example of a fuel tank 100 with a plurality of leakage detection devices 10. FIG. 8 is showing a cylindrical liquid hydrogen tank with optical glass fibers, belonging to the GFRP ply on top of the inner pressure vessel, functionalized for hydrogen sensing. The ends of these pairwise fibers (acting as optical duplex fibers) are seen through fictitious removal of the MLI-layer and the outer shell. A CFRP liquid hydrogen storage tank is shown, having a cylindrical part. Further, chemo-chromatic tape is covering duplex optical glass fibers.

In an example, a plurality of leakage detection devices is provided. The light-wave conducting components are provided as a plurality of glass fibers. The plurality of glass fibers is providing light conducting, electrical insulation and structural support.

According to an example, shown as an option, the plurality of the leakage detection devices 10 is arranged in a sensor pattern across the vessel forming the fuel tank 100.

In an example, the inner pressure vessel also comprises an electrically insulating layer with a glass fiber reinforced polymer structure. The electrically insulating layer is arranged on the outside of the one of the at least one layer made from multiple plies of the carbon fiber reinforced polymer structure, which one layer is enclosing the tank volume. Further, an example of the leakage detection device is arranged within the electrically insulating layer of the inner pressure vessel.

In an example, provided in addition or alternatively, the outer shell also comprises an electrically insulating layer with a glass fiber reinforced polymer structure. The electrically insulating layer is arranged on the outside of the layer made from multiple plies of the carbon fiber reinforced polymer structure. Further, an example of the leakage detection device is arranged within the electrically insulating layer of the outer shell.

In an example, the insulation sheathing comprises a plurality of reflective layers distanced from each other by spacer layers. Further, an example of the leakage detection device is arranged within the spacer layers.

In an example, the reflective layers are provided as support films coated with a reflective coating. For example, the reflective layers are made from Mylar or Kapton coated with silver or aluminum.

In an example, the spacer layers are provided as net spacers.

In an example, at least ten reflective layers are provided, for example at least twenty, 30 or 40 reflective layers.

According to an example, the light-wave conducting component of the leakage detection device is provided as a glass fiber of an existing glass fiber layer of at least one of the group of: the inner pressure vessel, the insulation sheathing and the outer shell.

As an example, a number of a plurality of glass fibers of an existing layer are designated as light-wave conducting components. One end of the designated glass fibers is used for light entering, i.e. light entry, and the fuel sensing tracer is arranged along the glass fiber or at an opposing end of the glass fiber.

For manufacturing, as an example, ends of the designated fibers are separated from the existing glass fibers in order to apply the fuel sensing tracer.

According to an example, the light-wave conducting component of the leakage detection device is provided as at least one glass fiber added to at least one of the group of the inner pressure vessel, the insulation sheathing and the outer shell.

The at least one glass fiber is added to a fiber comprising layer of the at least one of the group of: the inner pressure vessel, the insulation sheathing and the outer shell.

For example, a glass fiber, with or without coating, is pressed into a matrix/fiber layer.

In an example, the light-wave conducting component is at least one glass fiber added to, e.g. embedded in the at least one reinforced layer made from multiple plies of a carbon fiber reinforced polymer structure of the inner pressure vessel. In an example, glass fibers acting as light-wave conducting component(s) are laid onto a glass fiber layer. In another example, provided in addition or alternatively, glass fibers acting as light-wave conducting component(s) are laid onto a carbon fiber layer. In a further example, provided in addition or alternatively, glass fibers acting as light-wave conducting component(s) are laid onto one of the layers of the multilayer insulation.

In an example, the light-wave conducting component is at least one glass fiber added to, e.g. embedded in the at least one spacer layer between the at least two reflective layers of the insulation sheathing.

As an example, at least one of the spacer layers comprises a plurality of glass fibers that act as In an example, the light-wave conducting component is at least one glass fiber added to, e.g. embedded in the layer made from multiple plies of a carbon fiber reinforced polymer structure of the outer shell.

As an example, the added glass fiber is attached to an existing layer. For example, the added glass fiber is attached to an existing layer of glass fibers. For further example, the added glass fiber is attached to an existing layer of carbon fibers.

As another example, the added glass fiber is embedded within a matrix of the existing layer.

As an example, the added fiber is provided with an outer fiber sheathing or outer fiber coating.

As an example, the added fiber is provided without further fiber sheathing of coating.

According to an example, not further shown in detail, the fuel tank 100 is provided as a pressurized vessel comprising a primary extension direction along a longitudinal axis and a secondary extension transverse to the longitudinal axis such that the pressurized vessel forms a cylinder.

In a first option, the light-wave conducting component 14 is extending over a majority of its extension along an axial direction of the cylinder.

In a second option, the light-wave conducting component 14 is extending over a majority of its extension along a circumferential direction of the cylinder.

In a third option, the light-wave conducting component 14 is extending over a majority of its extension along a helical direction along the cylinder.

The primary longitudinal extension direction can be referred to as an axial extension. The secondary axial extension direction can be referred to as a radial extension.

In an example, a sensor matrix is provided a, in which the plurality of the fuel sensing tracers is providing a sensor pattern. As an example, the fuel tank is arranged with a diameter of approximately 1.0 m and a length of approximately 3.0 m. Sensors, e.g. the fuel sensing tracers, are provided with approximately 20 to 30 cm distance to each other.

In an option, the fuel sensing tracers are arranged within a vessel wall closer to an inside of the vessel wall than to an outside of the vessel wall.

For example, the detection by the fuel sensing tracers is provided in an outer portion (or outer layer) of the inner pressure vessel.

In an example, the detection by the fuel sensing tracers is provided within the tank wall, but as close to the inner volume of the tank as possible.

Figure 9:
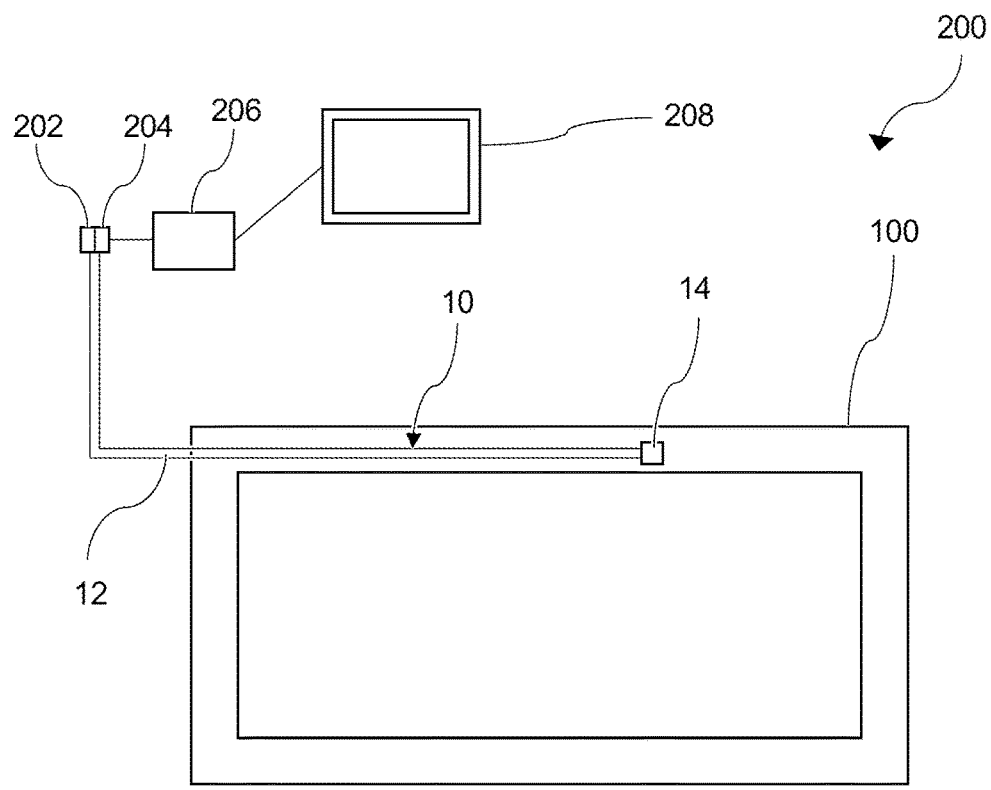
FIG. 9 schematically shows an example of a leakage detection system.

FIG. 9 schematically shows an example of a leakage detection system 200 for pressurized fuel tanks in an aircraft. The system 200 comprises at least one example of the fuel tank 100 for storing a pressurized fuel according to one of the proceeding examples. The system 200 also comprises a light source 202 and a light detector 204, a processing unit 206 and a display unit 208. The light source 202 is in optical contact with the light-wave conducting component 14 and is configured to emit light into the light-wave conducting component 14. The light detector 204 is in optical contact with the light-wave conducting component 14 and is configured to receive light from the light-wave conducting component 14. The processing unit 206 is configured to receive data from the light detector 14 representing the received light. The processing unit 206 is also configured to determine, based on the received light, a presence of the fuel within the tank enclosure indicating a leakage of the fuel tank. The processing unit 206 is further configured to generate indicator data for being displayed on the display unit 208. The display unit 208 is configured to provide the indicator data.

Figure 10:
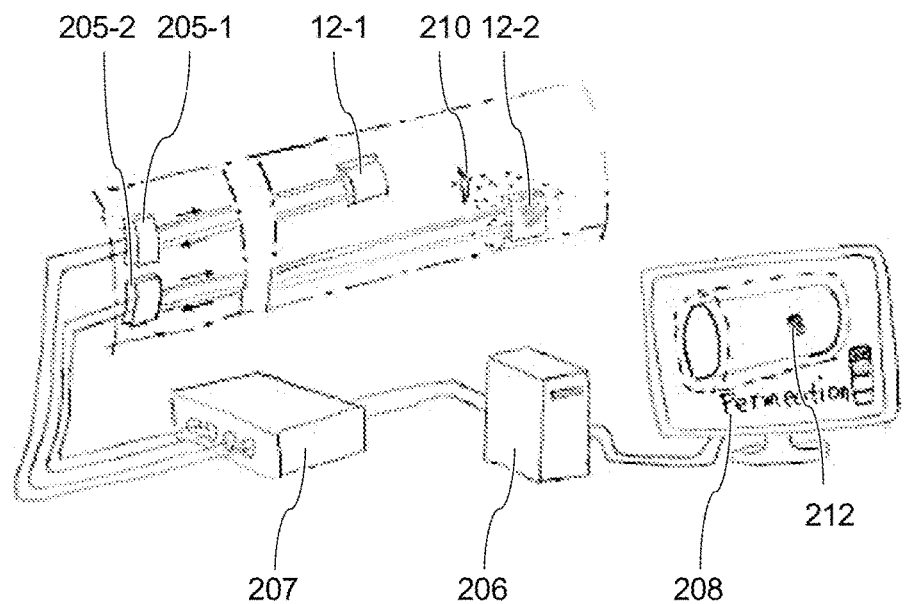
FIG. 10 schematically shows another example of a leakage detection system.

FIG. 10 shows another example of the leakage detection. FIG. 10 shows a cylindrical liquid hydrogen tank of CFRP with optical glass fibers, belonging to the GFRP ply of the inner pressure vessel 106, functionalized for hydrogen sensing. A first transmitter 205-1 is provided for optical signal by a first fuel-sensing tracer 12-1, based e.g. on laser. A second transmitter 205-2 is provided for optical signal by a second fuel-sensing tracer 12-2. Further, the first transmitter 205-1 is also configured as a receiver for the returned optical signal, and the second transmitter 205-2 is also configured as a receiver for the returned optical signal. A color spectrometer 207 may be arranged, and a computer 206 to which a graphic monitor 208 is data-connected for displaying results of hydrogen detection software. A damage 210 in the pressure vessel 106 is indicated, e.g. as crack, leading to leaking of hydrogen. For example, for the first fuel-sensing tracer 12-1, a chemo-chromatic tape is provided covering duplex optical glass fibers. For further example, for the second fuel-sensing tracer 12-2, also a further chemo-chromatic tape is provided covering duplex optical glass fibers, but in this case displaying, i.e. showing, a color change.

The leakage detection system shown in FIG. 10 is provided with two duplex optical glass fibers as part of the GFRP ply, making up the outermost ply of the inner pressure vessel 106. The two duplex optical fibers end at two different locations, where a chemo-chromatic tape is folded over the ends. The duplex optical fibers are continued into a color spectrometer, in which the return signal is converted to a color, the data of which is transferred to a computer, on which a graphical software is installed. This software is capable of converting color data into a graphic displaying the liquid hydrogen tank, and on this display signaled hydrogen leaks, as to size and location. On a displayed presentation of the inner pressure vessel 106, a crack leaking hydrogen 212 is seen near the bottom right, coloring the chemo-chromatic tape. In an example of the software, this area is displayed consistently.

In a further option, a leakage detection system for pressurized fuel tanks is provided. The leakage detection system is provided without a pressurized fuel tank but is meant to be attached to or mounted to a pressurized fuel tank. The leakage detection system comprises a leakage detection device for pressurized fuel tanks for storing a pressurized fuel according to one of the examples described above. Further, the leakage detection system comprises a light source and a light detector, a processing unit and a display unit. The light source is in optical contact with the light-wave conducting component and is configured to emit light into the light-wave conducting component. The light detector is in optical contact with the light-wave conducting component and is configured to receive light from the light-wave conducting component. The processing unit is configured to receive data from the light detector representing the received light. The processing unit is also configured to determine, based on the received light, a presence of the fuel within the tank enclosure indicating a leakage of the fuel tank. The processing unit is further configured to generate indicator data for being displayed on the display unit. The display unit is configured to provide the indicator data.

In an example, an aircraft with a fuel tank for storing a pressurized fuel or a leakage detection system is provided.

Figure 11:
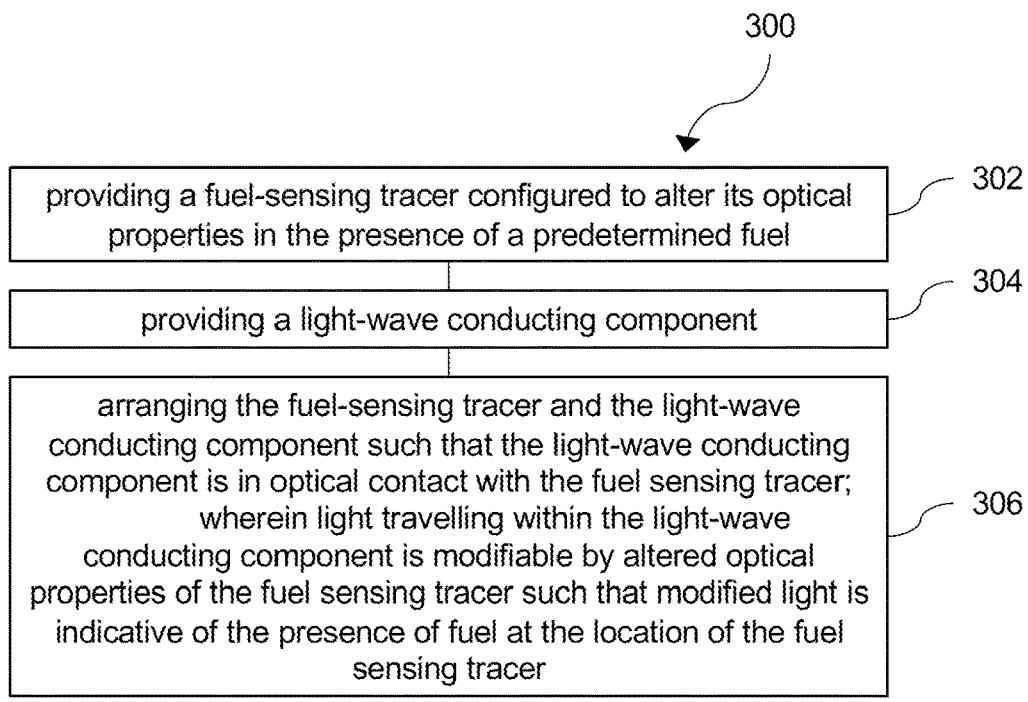
FIG. 11 shows basic steps of an example of a method for manufacturing a leakage detection device for pressurized fuel tanks.

FIG. 11 shows basic steps of an example of a method 300 for manufacturing a leakage detection device for pressurized fuel tanks. The method 300 comprises the following steps: In a first step 302, a fuel-sensing tracer is provided that is configured to alter its optical properties in the presence of a predetermined fuel. In a second step 304, a light-wave conducting component is provided. In a third step 306, the fuel-sensing tracer and the light-wave conducting component are arranged such that the light-wave conducting component is in optical contact with the fuel sensing tracer. Light travelling within the light-wave conducting component is modifiable by altered optical properties of the fuel sensing tracer such that modified light is indicative of the presence of fuel at the location of the fuel sensing tracer.

In an example of the method, the fuel-sensing tracer comprises at least a chemo-chromatic substance attached to a sensing base surface.

In an example of the method, a tape is acting as the base for the chemo-chromatic substance applied to one side of the tape. The tape is attached to the end of the light-wave conducting component such that the chemo-chromatic substance faces the end faces of the light-wave conducting component.

In another example of the method, the light-wave conducting component itself is acting as the base for the chemo-chromatic substance. The light-wave conducting component is applied to a portion of an outer surface of the light-wave conducting component.

Figure 12:
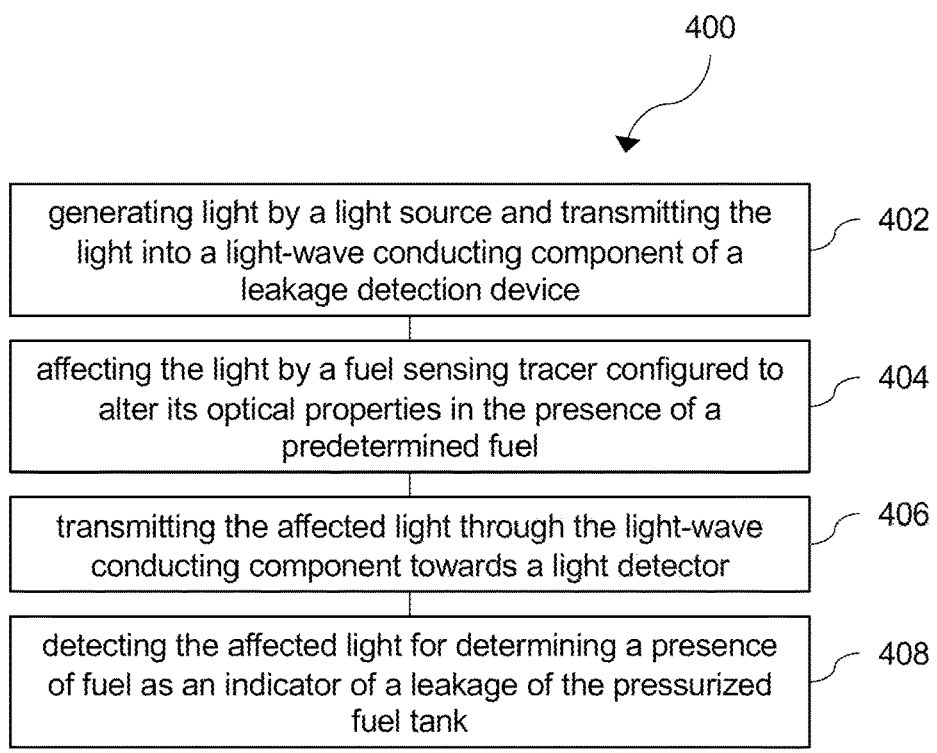
FIG. 12 shows basic steps of an example of a method for detecting leakage of a pressurized fuel tank.

FIG. 12 shows basic steps of an example of a method 400 for detecting leakage of a pressurized fuel tank. The method 400 comprises the following steps: In a first step 402, light is generated by a light source and the light is transmitted into a light-wave conducting component of a leakage detection device. In a second step 404, the light is affected by a fuel sensing tracer configured to alter its optical properties in the presence of a predetermined fuel. In a third step 406, the affected light is transmitted through the light-wave conducting component towards a light detector. In a fourth step 408, the affected light is detected for determining a presence of fuel as an indicator of a leakage of the pressurized fuel tank.

In an example, the detecting step also comprises the determination of a location of the leakage.

In an example, a repairing step of the leakage location is provided following the determination of the location.

In an example, following the detecting and determination steps, a step of resetting the at least one fuel sensing tracer is provided.

For example, before fixing a leakage, a reset substance is provided inside the tank and set under pressure such that the reset substance is reaching the at least one fuel sensing tracer through the same leakage as the detected fuel. The reset substance then changes the optical properties of the at least one fuel sensing tracer back to an initial state. The at least one fuel sensing tracer is then ready for further fuel detections.

In another example, the outer shell is removed, and the insulation sheathing is dismantled in order to replace the at least one fuel sensing tracer by at least one fresh fuel sensing tracers.

For example, a plurality of light-wave conducting components with attached used fuel sensing tracers is removed and replaced with a plurality of light-wave conducting components with attached fresh fuel sensing tracers.

In another example, only selected light-wave conducting components with attached used fuel sensing tracers are removed and replaced with a plurality of light-wave conducting components with attached fresh fuel sensing tracers.

In a further example, selected used fuel sensing tracers are removed and replaced with fresh fuel sensing tracers.

As an example, the fixing of a leakage is provided locally. The replacement or refreshing of the fuel sensing tracers is also provided locally.

As another example, the fixing of a leakage is provided locally or globally. The replacement or refreshing of the fuel sensing tracers is provided globally, i.e. replacing the complete set of fuel sensing tracers, or at least a majority of the fuel sensing tracers.

The disclosure herein provides a fast and reliable detection of hydrogen leakage in a CFRP liquid hydrogen tank built as a double shell with an inner structural pressure vessel, followed by multilayer insulation, MLI, covered by an outer shell. Focus is on the detection of hydrogen leakage through the inner pressure vessel, which is difficult to detect since it is covered by MLI and the outer shell. Part of the surface glass fiber ply of the inner pressure vessel, optical fibers, placed pairwise, functioning as a "Duplex" fiber optical cable, are ending at different locations, and at each end, a chemo-chromatic tape is glued around their end. The optical glass fibers are multifunctional, serving as optical fibers for hydrogen sensing, and at the same time they are part of the glass fiber ply, serving as an electrically insulating layer, recommended for all electro-chemical structures, and finally they take a certain amount of structural function. The multifunctional use of the optical fibers is weight saving, and the system is largely independent of electrical functional (for the part directly integrated on the tank) and is also invulnerable to electromagnetic effects.

The optical cables can comprise either dedicated fiber optical cables with core and mantle, which can be applied on top of the standard glass fiber layer and will carry out all three functions as of above, although it means a slight extra weight. Since the glass fiber, as long as running along the direction of the cylinder, are straight, no mantle is needed, and thus two of the ordinary glass fibers, already in the GFRP layer, can be singled out for this purpose and placed back. In this case, all three functions are carried out and no extra weight is applied.

In an example, a computer program is provided comprising instructions which, when the program is executed by a computer, cause the computer to carry out the method of the preceding examples.

In an example, a computer program or program element for controlling an apparatus according to one of the examples above is provided, which program or program element, when being executed by a processing unit, is adapted to perform the method steps for detecting leakage of one of the method examples above.

In another example, a computer readable medium having stored the computer program of the preceding embodiment is provided.

In another example embodiment of the disclosure herein, a computer program or a computer program element is provided that is characterized by being adapted to execute the method steps of the method according to one of the preceding embodiments, on an appropriate system.

The computer program element might therefore be stored on a computer unit or be distributed over more than one computer units, which might also be part of an embodiment of the disclosure herein. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the disclosure herein.

Aspects of the disclosure herein may be implemented in a computer program product, which may be a collection of computer program instructions stored on a computer readable storage device which may be executed by a computer. The instructions of the disclosure herein may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the disclosure herein may be distributed over multiple computers or processors.

As discussed above, the processing unit, for instance a controller implements the control method. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

This example embodiment of the disclosure herein covers both, a computer program that right from the beginning uses the disclosure herein and a computer program that by an update turns an existing program into a program that uses the disclosure herein.

Further on, the computer program element might be able to provide all necessary steps to fulfil the procedure of an example embodiment of the method as described above.

According to a further example embodiment of the disclosure herein, a computer readable medium, such as a CD-ROM, is presented wherein the computer readable medium has a computer program element stored on it which computer program element is described by the preceding section. A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further example embodiment of the disclosure herein, a medium for making a computer program element available for downloading is provided, which computer program element is arranged to perform a method according to one of the previously described embodiments of the disclosure herein.

It has to be noted that embodiments of the disclosure herein are described with reference to different subject matters. In particular, some embodiments are described with reference to methods whereas other embodiments are described with reference to the devices. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure herein has been illustrated and described in detail in the drawings and foregoing description, such illustration and description are to be considered illustrative or exemplary and not restrictive. The disclosure herein is not limited to the disclosed embodiments. Other variations to the disclosed embodiments can be understood and effected by those skilled in the art from a study of the disclosure herein.

The word "comprising" does not exclude other elements or steps, and the indefinite article "a" or "an" does not exclude a plurality. A single processor or other unit may fulfil the functions of several items. The mere fact that certain measures are recited in mutually different dependent claims does not indicate that a combination of these measures cannot be used to advantage.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuel tank for storing a pressurized fuel, the fuel tank comprising:
    a tank enclosure defining a tank volume, wherein the tank enclosure comprises:
        an inner pressure vessel that comprises at least one reinforced layer made from multiple plies of a carbon fiber reinforced polymer structure;
        an insulation sheathing that covers an outer side of the inner pressure vessel and comprises at least two reflective layers and at least one spacer layer between the at least two reflective layers;
        an outer shell that comprises a layer made from multiple plies of a carbon fiber reinforced polymer structure; and
        at least one leakage detection device comprising:
            a fuel-sensing tracer configured to alter optical properties thereof in a presence of a predetermined fuel; and
            a light-wave conducting component that is in optical contact with the fuel sensing tracer;
            wherein light travelling within the light-wave conducting component is modifiable by altered optical properties of the fuel sensing tracer to produce modified light that is indicative of a presence of fuel at a location of the fuel sensing tracer;
        wherein the at least one leakage detection device is arranged within at least one of the inner pressure vessel, the insulation sheathing, and the outer shell.

2. The fuel tank of claim 1, wherein:
the fuel sensing tracer comprises at least a chemo-chromatic substance attached to a sensing base surface;
the chemo-chromatic substance is chemo-chromatic sensitive to the predetermined fuel; and
the chemo-chromatic substance is chemo-chromatic sensitive to hydrogen.

3. The fuel tank of claim 2, wherein:
the chemo-chromatic substance is attached to at least one of:
    a portion along the light-wave conducting component, wherein one end of the light-wave conducting component is configured for light to enter the light-wave conducting component and another end of the light-wave conducting component is configured for light to exit the light-wave conducting component; and
    an end portion of the light-wave conducting component, wherein another end of the light-wave conducting component is configured for light to enter and exit the light-wave conducting component.

4. The fuel tank of claim 2, wherein:
the chemo-chromatic substance is:
applied to an end of the light-wave conducting component; or
attached to a tape mounted on an end of the light-wave conducting component; and
another end of the light-wave conducting component is configured for light to enter and exit the light-wave conducting component.

5. The fuel tank of claim 1, wherein:
the light-wave conducting component comprises at least one optical fiber—that comprises a first end and a second end; and
either:
the first end is configured for light to enter the light-wave conducting component and the second end is configured for light to exit the light-wave conducting component; or
the first end is configured for light to enter and exit the light-wave conducting component and a reverse of a light travelling direction is at the second end.

6. The fuel tank according to claim 1, wherein the light-wave conducting component of the at least one leakage detection device is a multi-functional element within the tank enclosure fulfilling at least one of a group of: electrical insulating and structural supporting, addition to light-wave conducting.

7. The fuel tank according to claim 1, wherein the light-wave conducting component of the at least one leakage detection device is a glass fiber of an existing glass fiber layer of at least one of a group of: the inner pressure vessel, the insulation sheathing, and the outer shell.

8. The fuel tank according to claim 1, wherein the light-wave conducting component of the at least one leakage detection device is provided as at least one glass fiber added to at least one of a group of the inner pressure vessel, the insulation sheathing, and the outer shell.

9. The fuel tank according to claim 1, wherein:
the fuel tank is a pressurized vessel comprising a primary extension direction along a longitudinal axis and a secondary extension transverse to the longitudinal axis, such that the pressurized vessel forms a cylinder; and
a majority of an extent of the light-wave conducting component extends along:
an axial direction of the cylinder;
a circumferential direction of the cylinder; and
a helical direction along the cylinder.

10. The fuel tank according to claim 1, wherein the at least one leakage detection device is a plurality of leakage detection devices that are arranged in a sensor pattern across a vessel forming the fuel tank.

11. A leakage detection system for an aircraft, the leakage detection system comprising:
at least one fuel tank according to claim 1;
a light source in optical contact with the light-wave conducting component and configured to emit light into the light-wave conducting component;
a light detector in optical contact with the light-wave conducting component and configured to receive light from the light-wave conducting component;
a processor configured to:
receive data from the light detector representing the received light;
determine, based on the received light, a presence of the fuel within the tank enclosure indicating a leakage of the fuel tank; and
generate indicator data; and
a display configured to display the indicator data.

12. A method for manufacturing the leakage detection system according to claim 11, the method comprising:
providing the fuel-sensing tracer;
providing the light-wave conducting component; and
arranging the fuel-sensing tracer and the light-wave conducting component such that the light-wave conducting component is in optical contact with the fuel sensing tracer;
wherein light travelling within the light-wave conducting component is modifiable by optical properties of the fuel sensing tracer to produce a modified light that is indicative of the presence of the predetermined fuel at a location of the fuel sensing tracer.

13. The method of claim 12, wherein:
the fuel sensing tracer comprises at least a chemo-chromatic substance attached to a sensing base surface;
the chemo-chromatic substance e is chemo-chromatic sensitive to the predetermined fuel; and
the chemo-chromatic substance is chemo-chromatic sensitive to hydrogen.

14. The method of claim 13, wherein:
the chemo-chromatic substance is attached to at least one of:
a portion along the light-wave conducting component, wherein one end of the light-wave conducting component is configured for light to enter the light-wave conducting component and another end of the light-wave conducting component is configured for light to exit the light-wave conducting component; and
an end portion of the light-wave conducting component, wherein another end of the light-wave conducting component is configured for light to enter and exit the light-wave conducting component.

15. The method of claim 13, wherein:
the chemo-chromatic substance is:
applied to an end of the light-wave conducting component; or
attached to a tape mounted on an end of the light-wave conducting component; and
another end of the light-wave conducting component is configured for light to enter and exit the light-wave conducting component.

16. The method of claim 12, wherein:
the light-wave conducting component comprises at least one optical fiber that comprises a first end and a second end; and
either:
the first end is configured for light to enter the light-wave conducting component and the second end is configured for light to exit the light-wave conducting component; or
the first end is configured for light to enter and exit the light-wave conducting component and a reverse of a light travelling direction is at the second end.

17. The method of claim 12, wherein the fuel sensing tracer is a reversible sensor that can be brought back to an initial sensing state by at least one of a group of:
passing of a preset amount of time;
supplying of a resetting substance; and
supplying of a resetting amount of energy.

18. A method for detecting leakage of a pressurized fuel tank, the method comprising:
providing the pressurized fuel tank, which comprises a tank enclosure that defines a tank volume, which comprises:
an inner pressure vessel that comprises at least one reinforced layer made from multiple plies of a carbon fiber reinforced polymer structure;
an insulation sheathing that covers an outer side of the inner pressure vessel and comprises at least two reflective layers and at least one spacer layer between the at least two reflective layers;
an outer shell that comprises a layer made from multiple plies of a carbon fiber reinforced polymer structure; and
at least one leakage detection device comprising a fuel-sensing tracer and a light-wave conducting component;
generating light by a light source;
transmitting the light into the light-wave conducting component;
altering optical properties of the fuel-sensing tracer in a presence of a predetermined fuel, which modifies the light transmitted into and travelling within the light-wave conducting component to produce a modified light;
transmitting the modified light through the light-wave conducting component towards a light detector; and detecting the modified light to determine the presence of the predetermined fuel to indicate leakage of the predetermined fuel from the pressurized fuel tank.

* * * * *